(No Model.) 2 Sheets—Sheet 1.
G. SMITH.
BROOM CORN SIZER.
No. 319,859. Patented June 9, 1885.
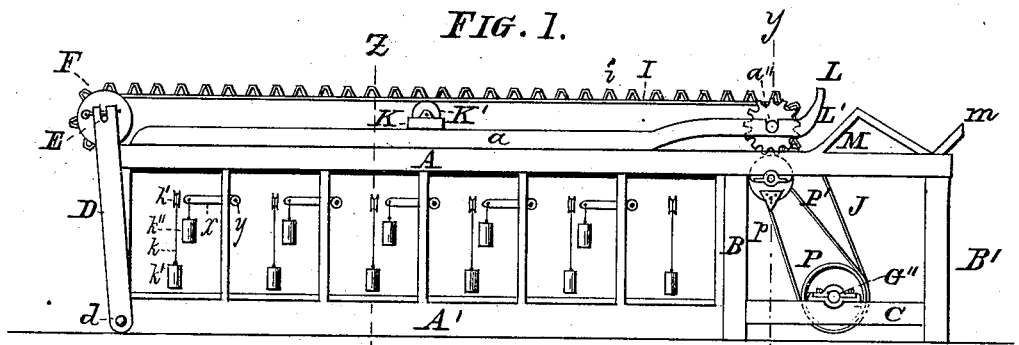
FIG. 1.
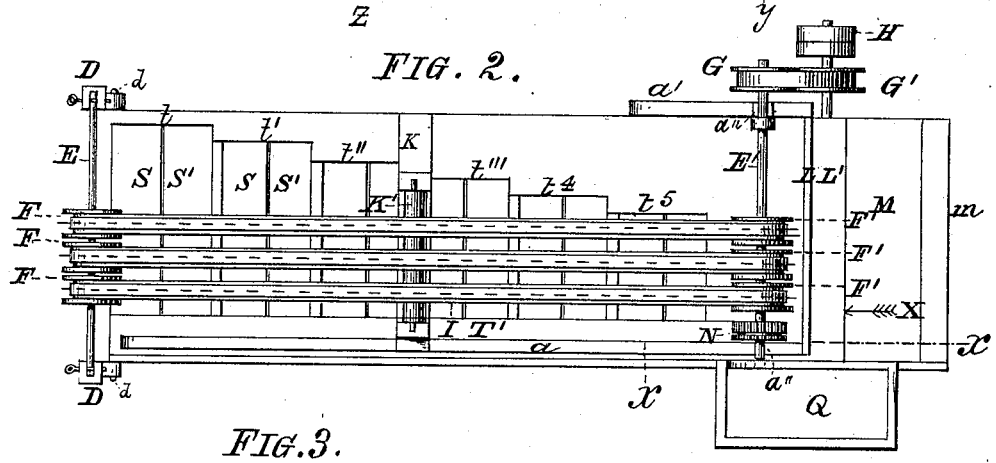
FIG. 2.
FIG. 3.
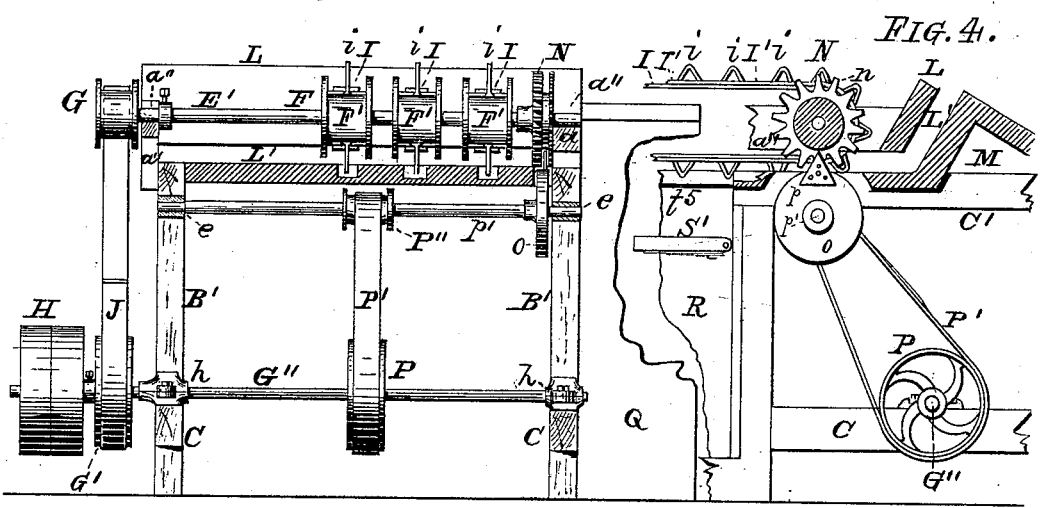
FIG. 4.
Witnesses:
A. Stark
Willie O. Stark
Inventor:
George Smith,
by Michael J. Stark,
Attorney.

(No Model.) 2 Sheets—Sheet 2.

G. SMITH.
BROOM CORN SIZER.

No. 319,859. Patented June 9, 1885.

Witnesses:
Al Stark
Willie O Stark

Inventor:
George Smith,
by Michael J Stark,
Attorney.

UNITED STATES PATENT OFFICE.

GEORGE SMITH, OF BUFFALO, NEW YORK.

BROOM-CORN SIZER.

SPECIFICATION forming part of Letters Patent No. 319,859, dated June 9, 1885.

Application filed March 13, 1884. (No model.)

*To all whom it may concern:*

Be it known that I, GEORGE SMITH, of Buffalo, in the county of Erie and State of New York, have invented certain new and useful Improvements in Machines for Sizing and Assorting Broom-Corn; and I do hereby declare that the following description of my said invention, taken in connection with the accompanying sheets of drawings, forms a full, clear, and exact specification, which will enable others skilled in the art to which it appertains to make and use the same.

My present invention has general reference to a machine for sizing and assorting broom-corn; and it consists, essentially, in the novel and peculiar combination of parts and details of construction, as hereinafter first fully set forth and described, and then pointed out in the claims.

Figure 5:
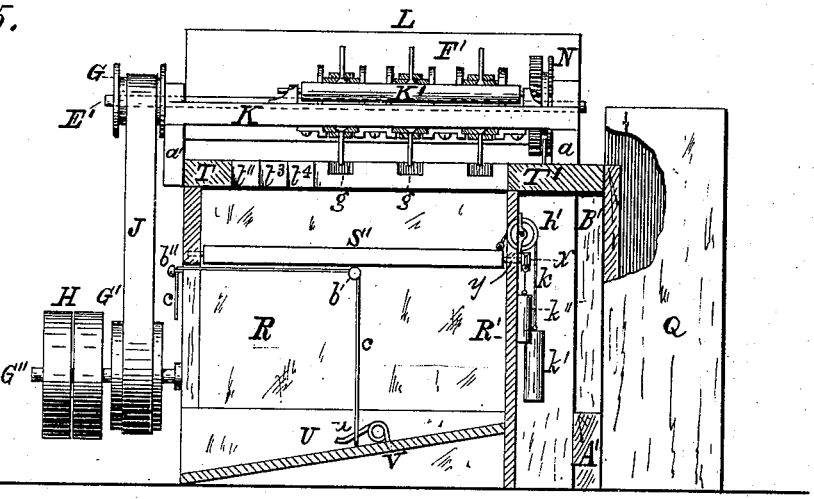
Figure 6:
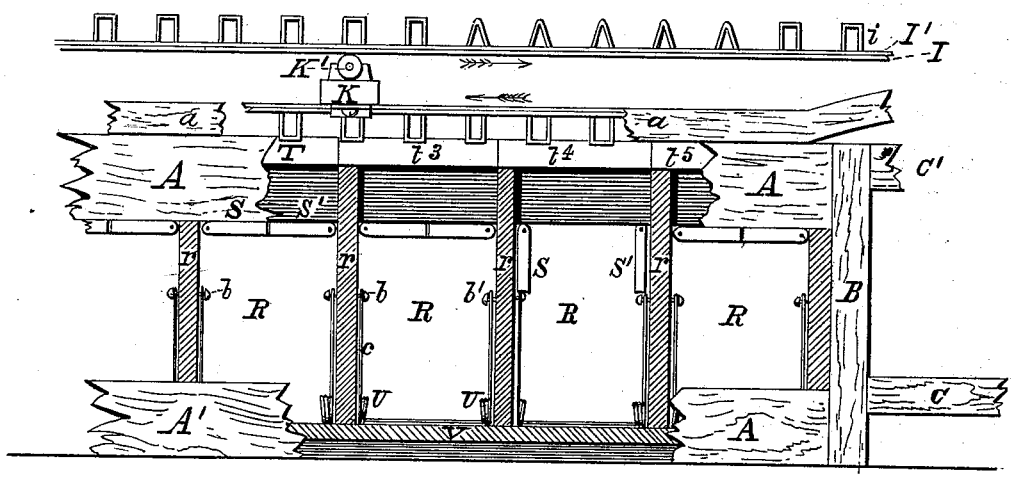
Figure 7:
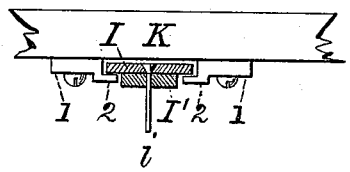
Figure 8:
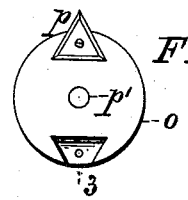

In the drawings already mentioned, which serve to illustrate my said invention more fully, Figure 1 is a side elevation, and Fig. 2 a plan, of my improved broom-corn sizer and assorter. Fig. 3 is a transverse sectional elevation in line $y\,y$ of Fig. 1. Fig. 4 is a longitudinal sectional elevation in line $x\,x$ of Fig. 2. Fig. 5 is a like view in line $z\,z$ of Fig. 1. Fig. 6 is a side elevation of a portion of the machine, some of the parts being broken to expose the interior construction. Fig. 7 is a side elevation illustrating the mechanism for carrying the conveyer-belt, and Fig. 8 is a front elevation of the knife-disk and the cutter or knife.

Like parts are designated by corresponding letters of reference in all the figures.

The object of my present invention is the production of a simple, cheap, and efficient device for sizing and assorting broom-corn. This corn as now supplied to the trade comes in bundles of a certain size, the contents of such bundles being broom-corn of different lengths of both the brush and the stalk, and in order to prepare the same for the broom and brush maker the stalks have to be cut off, so as to be but a few inches long from the butt-end of the brush, and then the corn assorted according to the length of the said brush. This operation, when performed by hand, is rather slow and primitive, and to render the same more expeditious and thereby less costly, which is the object of my said invention, I construct my broom-corn cutter and assorter substantially of a suitable frame consisting of properly-arranged beams or rails A A' and C C', posts B B', table T, and floor V, as clearly shown in the various figures. To the end of this frame I pivot at $d$ a pair of uprights, D, and journal therein, at their upper ends, a shaft, E, carrying a number of flanged pulleys, F, as shown in Figs. 1 and 2. Upon the beam A, I place a rail, $a$, and on the side of the frame opposite the rail $a$, I place a similar but shorter rail, $a'$, both rails being provided with bearings $a''$, for the reception of a shaft, E', having a series of flanged pulleys, F', corresponding in number and position with the pulleys F on the shaft E, said shaft E' being provided with a pulley, G, on one end, connecting with a similar pulley, G', by means of a belt, J. This pulley G' is secured, together with a tight and loose pulley, H, upon a shaft, G'', revolving in bearings $h$, fixed upon the rails C, connecting the uprights B B'. Upon the shaft G'' is furthermore secured a pulley, P, connecting by means of a belt, P', Figs. 3 and 4, with a pulley, P'', secured to a shaft, $p'$, journaled in boxes $e\,e$, secured to the under side of the rails C C'. This shaft $p'$ carries a disk, O, near one end, a knife or cutter, $p$, being secured to said disk O, to operate in conjunction with a star-wheel, N, fixed to the shaft E' in such manner that the said knife $p$ in revolving passes through a circumferential groove in said star-wheel N. This cutter $p$ consists of a triangular plate or disk sharpened along all its edges, set into a recess, 3, in the face of said disk O, so that it can be removed and changed in a short space of time.

The two sets of pulleys F F' are connected together by means of a series of endless conveyer-belts, I, consisting each of a main belt, I, and an auxiliary narrower belt, I', both being suitably connected, and the latter provided with a number of projecting pins, $i$, of suitable shape, serving as conveyers, in a manner hereinafter to be referred to. These belts are supported upon a transverse rail, K, by a carrying-roller, K', as shown in Figs. 1 and 2, and guided by means of guides 1 2, as illustrated in Fig. 7, the wider belt I forming, as it were, flanges for the narrower belt I' to rest and slide over the guides 1 2, as clearly illustrated in Figs. 5, 6, and 7.

To the end of the rails $a\ a'$ is secured a transverse board, L, and upon the rails C' C' an inverted V-shaped table, M, having a back board, $m$, there being a passage, L', between said board L and table M, by which the broom-corn is introduced into the machine, as will hereinafter more fully appear.

The entire frame of this machine is divided into a number of compartments, R, by means of partitions $r$ and R', each compartment being provided with double trap-doors S S', as clearly illustrated in Figs. 2, 5, and 6. Each of these doors has a device for keeping it in a horizontal position, consisting of either a roller or sheave, $h'$, secured to the partition R', and having a cord, $k$, with a weight, $k'$, as shown in said Figs. 1 and 5, or of a lever, $x$, fastened to the pivot $y$ of said trap-door, and provided with a weight, $k''$, whereby said doors are kept in proper position until sufficient corn has been deposited upon said trap-doors to cause them to "snap" or drop. Each of the compartments R has near its bottom a set of spring-fixtures, U, by which and a set of pins, $b$, a cord, $c$, is removably retained in said compartments, the object of such cords being to secure the broom-corn in each compartment into a bundle prior to its removal from said compartments. These cords are each formed with a loop, by which they are hitched to the pins $b$. They are then passed downwardly and across the floor V, underneath the spring-catch U, and then upward and forward over the pins $b'$, after which they are passed out of the compartments and secured to the pins $b''$, as shown in Figs. 5 and 6.

The table T of this machine has a series of openings, $t\ t'\ t''$, &c., each being a trifle shorter (or longer) than its predecessor, the shortest one being that nearest to the front end of the machine—viz., the table M.

Having thus described the construction of the machine, I shall proceed to explain its operation. Motion being communicated to the machine through the pulleys H, the operator, standing in front of the table M, places thereupon a lot of broom-corn, resting it against the back board, $m$, and then picks up a brush of corn and places it into the passage L', with the butt-end of the brush upon a mark provided on said table corresponding somewhat with the position of the arrow X in Fig. 2. In dropping down in the passage L', the knife $p$ on the disk O, revolving or passing through the groove in the star-wheel N, catches the butt-end and pushes it into one of the notches $n$ in the star-wheel, where said knife cuts off all of the stalk projecting beyond the star-wheel, the stalks falling into a box, Q, provided for that purpose. Now the pins $i$ on the endless belt catch hold of the brush and move it along toward the rear end of the machine, the said broom-corn resting with its stalk upon the portion T', Figs. 2 and 5, of the table, and the brush upon the notched portion T. In this manner the broom-corn is carried along until the end of its brush reaches a compartment where it is no longer supported upon the table T, when it will immediately drop upon the trap-doors S S', until a quantity has accumulated thereon sufficient to overcome the counter-weights $k'\ k''$, when the doors will drop and discharge the broom-corn into the respective compartment R. In this manner all the broom-corn is cut and assorted with unerring precision, so that the corn in each compartment is all of a length as regards both the stalk and the brush. Whenever a compartment R is full, the string $c$ is used to tie the broom-corn into a bundle, when it is ready for dampening and the usual subsequent operations.

It will be readily observed that in constructing a machine of the kind described many of the details referred to may be changed without departing from the spirit and nature of my invention. For instance, instead of applying power to the shaft G'' through the pulleys H from any source, I may provide this shaft with a crank and treadle, and apply foot-power thereto.

The pins $i$ in the conveyer-belting I may be made in various manners and shapes; but they should not be pointed, to prevent them from entering the brush of the broom-corn, which would thereby be caused to adhere to the belt and be liable to be carried beyond its proper compartment. A triangular or rectangular shape, as shown in Fig. 6, is very suitable for the purpose, the points being made from wire and suitably fastened in the belts I.

Having thus fully described my invention, I claim as new and desire to secure by Letters Patent of the United States—

1. In a broom-corn sizing and assorting machine, a series of conveyer-belts consisting each of two parts of belting of different width, said belting being studded with a number of pins, $i$, as and for the object specified, the wider belt forming lateral bearing-surfaces, as specified.

2. In a broom-corn sizing and assorting machine, the combination, with a series of conveyer-belts, of a number of compartments having successively longer entrance-openings, each compartment being provided with a trap-door, and mechanism, substantially as described, for keeping the trap-door in a horizontal position.

3. In a broom-corn sizing and assorting machine, the combination, with the shaft E', carrying the grooved star-wheel N, of the shaft $p'$, having the disk O, provided with the triangular cutter $p$, as stated, said shafts being rotated by proper mechanism, as and for the object specified.

4. In broom-corn sizing and assorting machines, a reversible cutter consisting of a triangular plate sharpened on all its edges, said plate being inserted into a recess, 3, in said disk O, and constructed to operate in conjunction with the star or feed wheel, as specified.

5. The combination, with the endless belt I I', of the supporting-roller K', the carrying-rail K, and L-shaped guides 1 2, substantially as described, and for the purposes set forth.

6. The combination, with the receiving-compartments R, having the trap-doors S S', of the floor V, the spring-fixtures U, and pins $b\ b'$, as and for the purpose stated.

In testimony that I claim the foregoing as my invention I have hereto set my hand in the presence of two subscribing witnesses.

GEORGE SMITH.

Attest:
MICHAEL J. STARK,
JOHN C. DUERR.